United States Patent [19]

Izumo

[11] Patent Number: 4,946,479
[45] Date of Patent: Aug. 7, 1990

[54] APPARATUS FOR SOLVENT RECOVERY

[75] Inventor: Masanori Izumo, Neyagawa, Japan

[73] Assignee: Daikin Industries, Ltd., Osaka, Japan

[21] Appl. No.: 263,802

[22] Filed: Oct. 28, 1988

[30] Foreign Application Priority Data

Oct. 28, 1987 [JP] Japan ............................ 62-165927[U]
Oct. 28, 1987 [JP] Japan ............................ 62-165930[U]
Oct. 28, 1987 [JP] Japan ............................ 62-165931[U]

[51] Int. Cl.$^5$ ............................................. B01D 53/06
[52] U.S. Cl. ........................................ 55/181; 55/390
[58] Field of Search ................. 55/34, 60, 61, 78, 181, 55/355, 390

[56] References Cited

U.S. PATENT DOCUMENTS

| 164,825 | 6/1875 | Fish | 55/355 X |
|---|---|---|---|
| 2,294,214 | 8/1942 | Seinfeld | 55/390 X |
| 2,347,829 | 5/1944 | Karlsson et al. | 55/390 X |
| 2,507,608 | 5/1950 | Miller | 55/390 X |
| 2,639,000 | 5/1953 | Edwards | 55/390 X |
| 3,176,446 | 4/1965 | Siggelin | 55/390 X |
| 3,252,273 | 5/1966 | Stephens | 55/390 X |
| 3,345,806 | 10/1967 | Bullock et al. | 55/355 X |
| 3,847,578 | 11/1974 | Munters | 55/390 |
| 3,855,719 | 12/1974 | Jonsson | 55/390 X |
| 4,046,525 | 9/1977 | Matsuo et al. | 55/390 X |
| 4,133,657 | 1/1979 | Krogsrud | 55/355 X |
| 4,259,092 | 3/1981 | Matsuo et al. | 55/78 |
| 4,348,362 | 9/1982 | Foss | 55/390 X |
| 4,391,616 | 7/1983 | Imamura | 55/390 X |
| 4,409,006 | 10/1983 | Mattia | 55/60 X |
| 4,490,161 | 12/1984 | Ito et al. | 55/390 X |
| 4,846,855 | 7/1989 | Tsujimoto | 55/390 X |

FOREIGN PATENT DOCUMENTS

| 2311317 | 9/1972 | Fed. Rep. of Germany | 55/390 |
|---|---|---|---|
| 38004315 | 5/1960 | Japan | 55/390 |
| 59-046113 | 3/1984 | Japan | 55/355 |

Primary Examiner—Robert Spitzer
Attorney, Agent, or Firm—Wenderoth, Lind & Ponack

[57] ABSTRACT

An apparatus having a honeycomb rotor for adsorbing solvent in to-be-treated gas that is supplied to the rotor, which rotor also receives a supply of regenerating water vapor, wherein the water vapor is laden with the solvent after desorption of the solvent takes place, the water vapor mixture being then condensed. A seal structure is provided between the rotor and a housing to divide the interior of the housing into a plurality of regions, the seal allowing the rotor to rotate. The gas to be treated and reactivating water vapor are supplied to one of the regions at different positions in the direction of rotation of the rotor, whereby continuous and high speed treatment can be performed. The water vapor mixture which is not condensed, along with gases used to dry the rotor, are combined with the to-be-treated gas.

4 Claims, 7 Drawing Sheets

APPARATUS FOR SOLVENT RECOVERY

BACKGROUND OF THE INVENTION

1. Field of the Invention

This invention relates to a solvent recovery apparatus for recovery of solvents, such as thinner, which can conveniently employed in, for example, printing factories and painting works.

2. Description of the Prior Art

In printing factories and painting works, for example, large quantities of thinners, such as ink thinner and paint thinner, are used and, as a result, mixture gases containing such organic solvents are produced in high concentrations. From the standpoints of improvement of workshop environments, personnel health protection, in-plant explosion proofing, and environmental pollution control, these establishments require recovery of organic solvents from such mixture gases.

In such factories and works, exhausted gas in low concentration is produced by using paint. The low concentration exhaust gas is produced in large quantity, and in the case where organic solvents are recovered from such exhaust gas in a conventional device mentioned hereinafter, it is required that the device be large in size and the running cost is high.

For recovery of such organic solvents, it is known to employ apparatuses such as a fixed bed type recovery apparatus and a fluidized bed type recovery apparatus. A fixed bed type recovery apparatus includes a plurality of adsorption towers loaded with activated carbon which operate in two stages, an adsorption stage and a desorption stage, so that operation of individual towers can be changed over from the one stage to the other. A fluidized bed type recovery apparatus is of such an arrangement that a mixture gas stream is fed into an adsorption tower through a lower portion thereof and, in the course of its flow in the tower, solvent matter is recovered from the gas stream by being adsorbed on grains of an adsorbent, such as activated carbon, as the adsorbent flows downward in each of a plurality of adsorption stages provided in the tower along the vertical axis.

The foregoing prior art fixed-bed type solvent recovery apparatus requires a large installation space because it must have plurality of adsorption towers. Further, the flow rate of air in each tower should usually be relatively low, i.e., 0.2–0.3 m/sec, since an air flow rate in excess of such velocity range has the effect of lowered adsorption efficiency. Thus, since the rate of air flow is low, if solvents are recovered from the gases to be treated in low concentration, there occurs a problem that the adsorption towers must be excessively large in size, compared with the amount of recovered gases per unit time.

Another problem with such a solvent recovery apparatus is the pressure loss in the adsorption towers is considerably large, i.e., 500–800 mmAq, which fact requires an air blower and a pipe line, both of a large capacity, so that the apparatus is naturally of a large size, which in turn entails an increased cost of operation.

Another problem is that since grains of an adsorbent, such as activated carbon, on which solvents are adsorbed have to be transported over a comparatively long distance, in the case where a corrosive gas such as, for example, halogen gas is to be treated, anticorrosion treatment must be applied to the entire path of transport for the gas, which results in exceptionally high equipment cost.

In the case of the piror art fluidized bed type recovery apparatus, the rate of air flow is generally 0.6–0.8 m/sec, and pressure loss is 150–200 mmAq and, because of these facts, there have been encountered problems similar to those with the fixed bed type recovery apparatus.

With such prior art solvent recovery apparatuses, of both the fixed bed type and the fluidized bed type, as mentioned above, it has been the usual practice that mixture gases cointaining desorbed solvent removed from the adsorption and desorption towers a residual gas present after collected components have been condensed in a condenser, the exhausts of reactivating gases used for reactivation of adsorptive matter within the adsorption and desorption towers are released into the atmosphere after they are subjected to predetermined treatments, such as dust removal and cooling. Development of a technique for effective utilization of such exhaust gases has been demanded in the art.

In a known solvent recovery apparatus, of both the fixed bed type and the fluidized bed type, as mentioned above, the flow velocity of the gas stream is low, so that in the case where solvents are recovered from exhaust gases of a large capacity in low concentration, there occurs a problem that the arrangement is necessarily of a large size design. According to this third type prior art, gas that is to be treated is supplied at a certain position in the circumferential direction of the rotary adsorption device so that solvent contained in the gas is adsorbed on the rotary adsorption device and the adsorbed solvent is desorbed at a location on the downstream side in the direction of rotation of the rotary device relative to the position at which adsorption takes place.

In such a prior art solvent recovery apparatus, a rubber seal is used in order to provide airtightness between the rotary adsorption device and the housing in which the device is housed. That is, at least either the rotary adsorption device or the housing is provided with the rubber seal so that such airtightness is obtained by the rubber seal being airtightly held in contact with the housing or the rotary device.

With such prior air seal structure, however, the seal structure becomes readily damaged due to deformation or material deterioration with age of the rubber seal.

The rotary adsorption recovery body in such prior art, is so constructed that activated carbon in granular form fills the frame. It is known that the flow rate of the gas stream in the recovery apparatus using the rotary adsorption body is 0.2–0.3 m/sec, and the pressure loss is 300–600 mmAq, and therefore, problems similar to those with each type of solvent recovery apparatus in prior art as mentioned above have been encountered.

FIG. 1 is a flow diagram showing still another arrangement of solvent recovery apparatus. The solvent recovery apparatus if formed with a paper which is made from mixture of activated carbon in fiber form and cellulose, and possesses a rotary adsorption body 70 having a honeycomb construction. The honeycomb construction is in an appropriate state for air flow and the flow rate is increased in this prior arrangement.

In the case where the rotary adsorption body 70 in which solvent is adsorbed, is reactivated, cellulose has low durability and low burning resistances, so the solvent can not be desorbed directly with water vapor.

Accordingly, it has been the usual practice that the solvent is desorbed from the rotary adsorption body 70 with hot air, and after exhausted gas is cooled by a cooling means 71, the solvent is adsorbed by an adsorption means 72. The adsorption means 72 is supplied with water vapor, and after desorbing solvent with water vapor, the exhaust gases are liquidized by condensation in a condensing means 73. The liquid obtained is a mixture of water and solvent and is separated by separating means 74, using the difference in specific gravity for example.

In such prior art, there is possibility that the flow rate is increased, but the rotary adsorption body 70 must be provided with the cooling means 71 and adsorbing means 72 on the outer portion of the body 70, which result in a large size of the arrangement and the cost of operation being high.

SUMMARY OF THE INVENTION

It is an object of the invention to provide a solvent recovery apparatus and circulation type solvent recovery system which can overcome the foregoing problems, can afford considerable reduction in size and improved usability, and can enhance working efficiency and energy saving.

It is another object of the invention to provide a seal structure which overcomes aforesaid difficulty with the prior art seal structure, can afford satisfactory air/gas tightness, and is not liable to deterioration with age in its performance.

It is still another object of the invention is to provide a solvent recovery apparatus having a small size and simple construction in the case where gases to be treated are of a large capacity and low concentration.

In order to accomplish these objects, this invention provides a solvent recovery apparatus which comprises:

rotary adsorption means provided rotatably around an axis thereof form adsorbing gases to be treated, and having a plurality of parallel gas passages extending along the axis, gas supply means for supplying the gases to be treated to the rotary adsorpion mean from one side in the axial direction of the adsorption means, water vapor supply means for supplying water vapor for reactivating the rotary adsorpion means at a position on the downstream side in the direction of rotation of the adsorption means relative to the position for supply of the gases to be treated to the adsorption means, and condensation mean for condensing a water vapor-solvent mixture discharged from the rotary adsorption means.

In a preferred embodiment, a solvent recovery apparatus is provided with hot air supply means for supplying hot air to dry the rotary adsorption means at a position downsteam in the direction of rotation of the rotary adsorption means relative to the position for supply of the reactivating water vapor.

In another preferred embodiment, there is provided cool air supply means for supplying cooling air to dry the rotary adsorption means at a position downstream in the direction of rotation of the rotary adsorption means relative to the position for supply of the hot air.

In a further preferred embodiment, the shaft of the rotary adsorption means extends in the vertical direction.

In another preferred embodiment, the rotary adsorption means has a honeycomb construction formed of an activated-carbon impregnated material having water vapor resistance and which has a plurality of vent holes extending therethrough along the rotation axis of the rotary adsorption means.

In another preferred embodiment, the flow rate of the gases to be treated is selected to a level near 2.0 m/sec or less.

In a further preferred embodiment, the apparatus further comprises:

an airtight housing in which the rotary adsorption means is housed, and a seal structure provided between the rotary adsorption means and the housing, the housing being airtightly divided into a plurality of parts extending along the axis of the rotary adsorption means.

In a still further preferred embodiment, the gases to be treated, reactivating water vapor, drying hot air, and drying cool air are flow-rate controlled by dampers and flow control valves.

This invention also provides a circulation type solvent recovery system comprising:

adsorption/desorption means including a rotary adsorption means rotatably provided therein and having an adsorption zone and a desorption zone, gas supply means for supplying gases to be treated to the adsorption/desorption means, reactivating gas supply means for supplying to the rotary desorption means, individually, plural kinds of gases including water vapor for reactivating the rotary adsorption means, condensation means for condensing a solvent-desorbed mixture gas, and circulation pipe lines for refluxing to the gas supply means at least a portion of gas discharged from the condensation means and other reactivating gases discharged from the adsorption/desorption means.

In a preferred embodiment, the walll surface of the rotary adsorption means is formed with a plurality of solvent adsorbable parallel gas passages.

In another preferred embodiment, the circulation pipe lines are individually provided with flow control means corresponding to each kind of the gases.

In still another preferred embodiment, the reactivating gases are water vapor, hot air, and cool air.

This invention also provides a seal structure of a solvent recovery apparatus provided between an airtight housing and a rotary adsorption means disposed in the housing and dividing the interior of the housing into a plurality of regions, comprising:

a cylindrical member larger in diameter than the rotary adsorption means and being airtightly fitted over the entire periphery of the rotary adsorption means, and an annular bath provided in the housing in airtight relation therewith and having a liquid stored therein, in which liquid the cylindrical member is immersed.

In a preferred embodiment, the annular bath includes an outer tube, an inner tube, and a bottom plate, the axial length of at least the outer tube being selected to a length that is higher than the liquid level at the time of an envisaged maximum atmospheric pressure difference between the individual regions within the housing.

This invention, in a further aspect thereof, provides, a solvent recovery apparatus comprising:

an airtight housing, rotary adsorption means for adsobing gases to be treated disposed in the housing to divide the housing into a plurality of regions whose walls are formed with a plurality of solvent-adsorbable parallel gas passages, a cylindrical member larger in diameter than the rotary adsorption means and being airtightly fitted on the adsorption means over the entire periphery thereof, an annular bath provided in the housing in aritight relation therewith and having a liquid stored therein, in which liquid the cylindrical member is immersed, gas supply means for supplying gas to be treated to the rotary adsorption means in the axial direction thereof from one side, water vapor supply means for supplying water vapor for reactivating the rotary adsorption means at a position on the downstream side in the direction of rotation of the adsorption means relative to the position for supply of the gas to be treated, and condensation means for condensing water vapor mixed with solvent discharged from the rotary adsorption means.

This invention also provides a solvent recovery apparatus comprising:

rotary adsorption means, formed of materials including inorganic fiber and an activated-carbon, provided rotatably around an axis thereof for adsorbing gases to be treated, and having a plurality of parallel gas passages extending along the axis, gas supply means for supplying the gases to be treated to the rotary adsorption means from one side in the axial direction of the adsorption means, water vapor supply means for supplying water vapor for reactivating the rotary adsorption means at a position on the downstream side in the direction of rotation of the adsorption means relative to the position for supply of the gases to be treated to the adsorption means, and separation means for separating solvent and water from a water vapor-solvent mixture discharged from the rotary adsorption means.

According to the invention, a stream of to-be-treated gases containing solvent to be recovered is supplied from the to-be-treated gases supply means to the rotary adsorption means having a multiplicity of solvent-adsorbable parallel gas passages formed on the wall surface thereof, and the solvent in the gases is adsorbed on the rotary adsorption means.

Reactivating water vapor is supplied to the rotary adsorption means by the water vapor supply means located at a circumferential position different from the position for supply of the to-be-treated gases to the rotary adsorption means. The solvent adsorbed on the rotary adsorption means is desorbed by this water vapor, and a solvent mixed water vapor is discharged from the adsorption means and condensed in the condensation means. The rotary adsorption means reactivated by the reactivating water vapor is again supplied with to-be-treated gases stream by the to-be-treated gases supply means as it continues to rotate, so that it repeats its adsorption performance. By the rotary adsorption means being rotated in this way, treatment of solvent for recovery can be continuously performed. The water vapor mixture which is not condensed, along with gases used to dry the rotor, are combined with the to-be-treated gas.

According to the invention, therefore, it is possible to provide a solvent recovery apparatus that is small in size and simple in construction and, at the same time, to reduce power requirements for operation of the recovery apparatus. Thus, considerable energy savings can be achieved.

In the circulation type solvent recovery system of the invention, a plurality of kinds of gases including water vapor are supplied to the rotary adsorption means for reactivation thereof. For this purpose, circulation pipe lines are provided for refluxing to the to-be-treated gases supply means at least a portion of a gas discharged from the condensation means after condensation therein of a solvent-desorbed mixture gases and also gases discharged from the adsorption/desorption means and originating from the other kinds of reactivating gases supplied to the adsorption/desorption means.

Therefore, according to the invention, the to-be-treated gases supplied to the solvent recovery apparatus is preconcentrated with the discharged gases, so that remarkable improvement can be obtained in treatment efficiency.

Further, energy contained in a mixture gases or the like can be used for purposes such as heat-up of the gases being treated, and accordingly good energy saving can be achieved.

In the seal structure in accordance with the invention, there is provided a rotary adsorption means in an airtight housing, whereby the housing is divided into a plurality of regions. A cylindrical member larger in diameter than the rotary adsorption means is fitted on the rotary adsorption means over the entire periphery thereof, and an airtight annular bath is provided in the housing. A liquid is stored in the annular bath and the cylindrical member is immersed in the liquid. The plurality of regions are thus airtightly sealed against each other by the liquid in the annular bath, whereby sufficient airtightness can be obtained.

While the cylindrical member is rotated and displaced as the rotary adsorption means rotates, the cylindrical member is positioned in the annular bath with the liquid placed between the former and the latter. Therefore, it is unnecessary to use a construction where the cylindrical member and the annular bath are in direct contact with each other or where a member which provides airtight contact is interposed for sliding contact with the rotary adsorption means or the housing. Thus, any possible damage to the airtightness of the seal structure due to deformation or material deterioration with age of such a member can be prevented.

Therefore, according to the invention, the plurality of regions within the housing are airtightly shut off from each other. Thus, sufficient airtightness is assured. No provision is needed fro interposition of the rotary adsorption means which can be in airtight contact with both the housing and the rotary adsorption means, and accordingly any possible damage to the airtightness due to deformation or material deterioration with age of such adsorption means can be prevented.

According to this invention, the rotary adsorption means is formed of materials including inorganic fiber and activated carbon, and has many parallel gas passages, extending along the axis, which can adsorb solvent. Therefore this invention accomplishes increased flow velocity within the rotary adsorption means. Inorganic fiber, furthermore, is excellent in durability and burning resistance, and the solvent can be desorbed from the rotary adsorption means by supplying with water vapor. Therefore, compared with the prior art, this invention accomplishes reduction in size.

DESCRIPTION OF THE PREFERRED EMBODIMENTS

Figure 2:
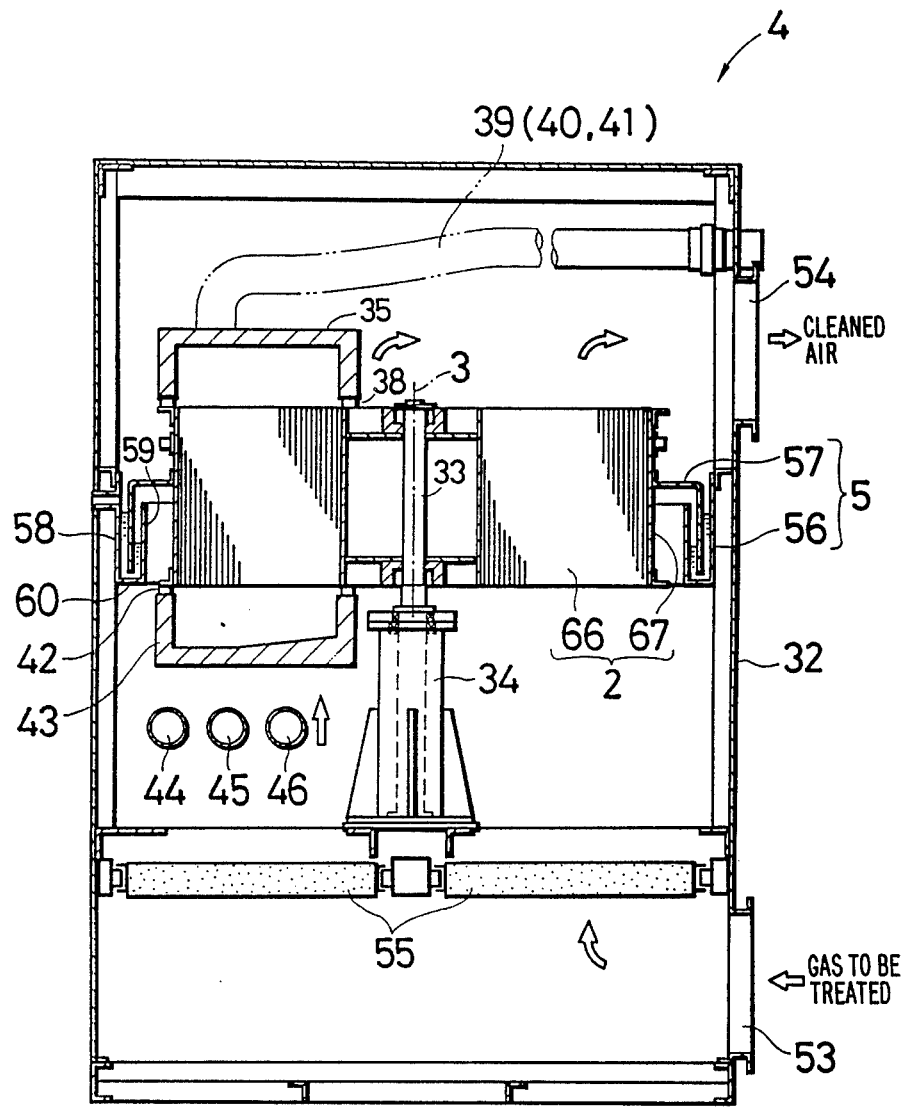
FIG. 2 is a longitudinal sectional view of a solvent recovery apparatus of one embodiment of the invention.

FIG. 2 is a longitudinal sectional view of a solvent recovery apparatus (hereinafer referred to as recovery apparatus) of one embodiment of the invention. The recovery apparatus 4 has a honeycomb rotor 2 disposed in an airtight housing 32 which is divided into two chambers, upper and lower, by a seal structure 5. Solvent in gas that is to be treated is adsorbed by the honeycomb rotor 2. Reactivating water vapor, drying hot air, and drying cool air are supplied to the honeycomb rotor 2 through supply pipe lines 39, 40, 41 respectively. Honeycomb rotor 2 comprises a cylindrical frame 67, and an adsorption body 66 is mounted in the frame 67.

Figure 3:
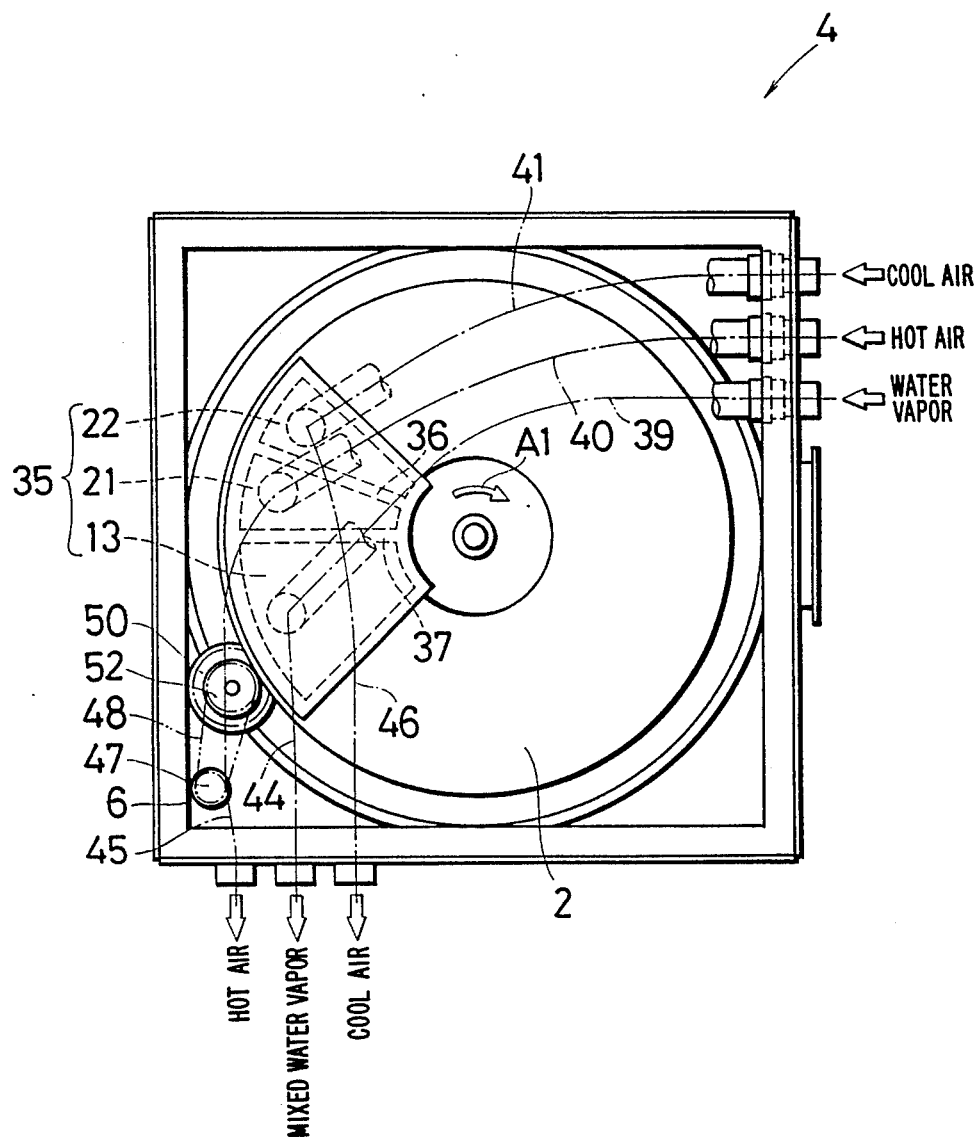
FIG. 3 is a plan view of the solvent recovery apparatus.

FIG. 3 is a plan view of the recovery apparatus 4. The supply pipe lines 39, 40, 41 are connected respectively to three compartments within a cover member 35 of the honeycomb rotor 2. The three compartments are arranged in the direction of rotation of the honeycomb rotor 2. Thus, adsorption by the honeycomb rotor 2 and reactivation thereof is carried out in parallel, so that continuous operation is possible.

Figure 1:
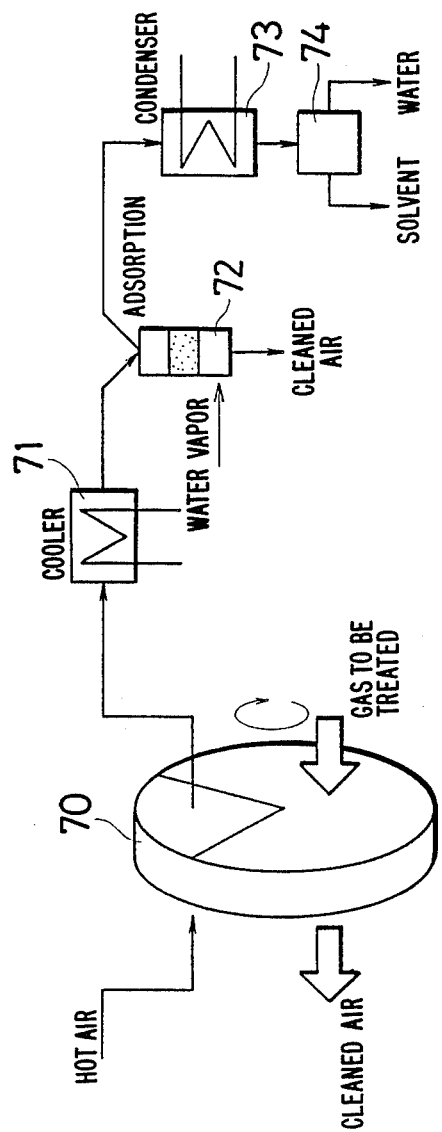
FIG. 1 is a flow diagram of a prior art device.
Figure 4:
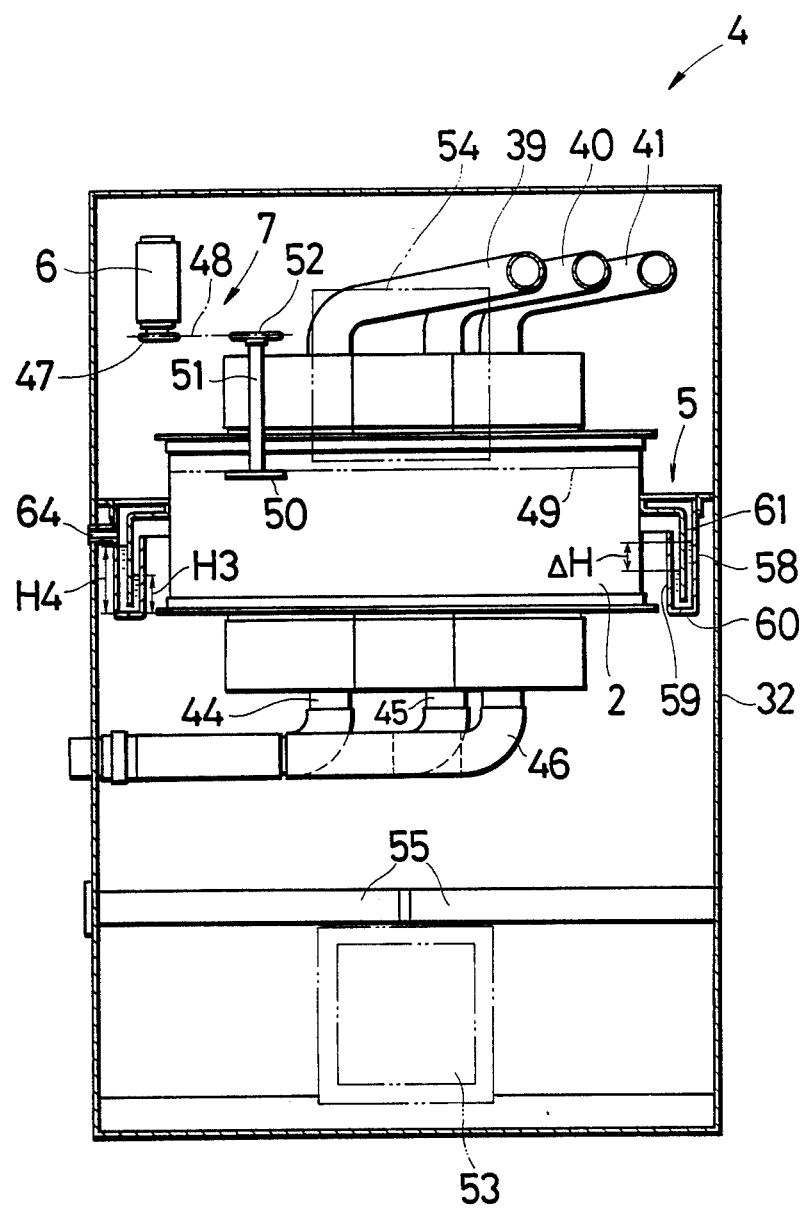
FIG. 4 is a right side view in longitudinal section, of the solvent recovery apparatus.

FIG. 4 is a right side view in longitudinal section of the recovery apparatus 4 shown in FIG. 1. The housing 32 has a supply or inlet port 53 for the gas to be treated and an exhaust port 54. The seal structure 5 is a water seal construction and is installed in a space between the honeycomb rotor 2 and the housing 32.

Figure 5:
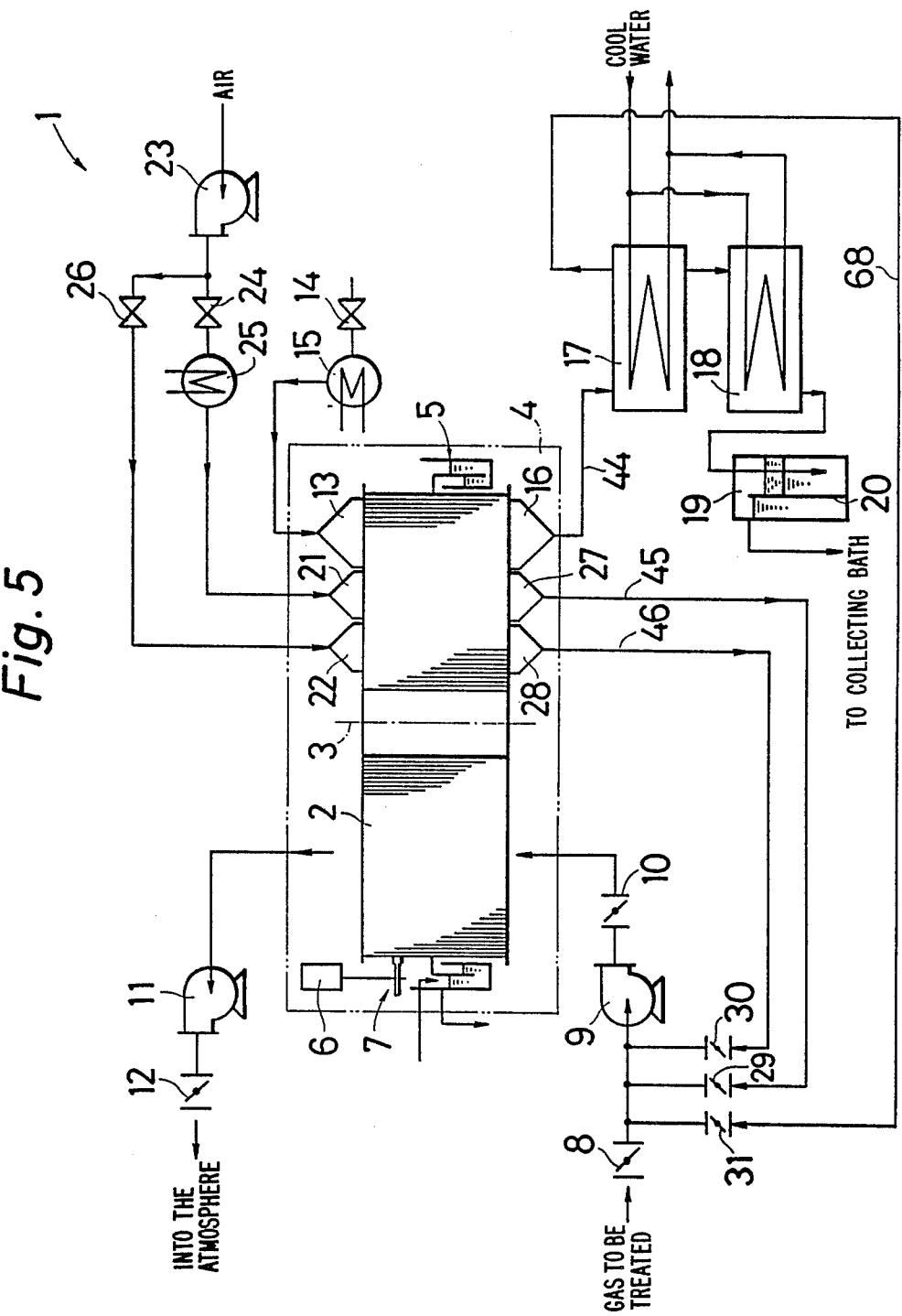
FIG. 5 is a system diagram of a circulation type solvent recovery system embodying the invention.

FIG. 5 is a system diagram showing the arrangement of a circulation type solvent recovery system 1 (hereinafter referred to as recovery system) embodying the invention. The recovery system 1 will be explained with reference to FIG. 5. The recovery system of the invention can be advantageously employed in such establishments as, for example, automobile painting workshops or printing factories, for recovery of organic solvents, such as printing ink thinner or paint thinner. The recovery system 1 includes the honeycomb rotor 2 as a rotary adsorption means. The honeycomb rotor 2 is formed of a water vapor resistant material such as; for example, ceramic paper, impregnated with activated carbon, and has a honeycomb configuration with a multiplicity of parallel vent holes formed on a wall surface and extending through the honeycomb rotor 2 in the axial direction thereof. An axis 3 of the honeycomb rotor 2 extends generally vertically as will be described hereinafter.

Between the honeycomb rotor 2 and the housing (not shown) of the recovery apparatus 4 is provided the seal structure 5 (to be described hereinafter), which airtightly separates one half portion (lower side in FIG. 5) of the honeycomb rotor 2 from the other half portion (upper side in FIG. 5) in the axial direction of the honeycomb rotor 2 within the recovery apparatus 4. There is provided a drive mechanism 7 including a geared motor 6 for driving the honeycomb rotor 2 in rotation.

Gas to be treated, which contains an organic solvent, such as thinner, is supplied to the recovery apparatus 4 through a damper 8, a blower 9, and a damper 10. The solvent component of the gas to be treated is adsorbed by the honeycomb rotor 2 and, as will be described, desorbed and cleaned air is released, for example, into the atmosphere through the blower 11 and the damper 12.

With respect to the honeycomb rotor 2, a first supply member 13 is a water vapor supply means for supplying water vapor for regeneration of the honeycomb rotor 2. Member 13 is provided at a position different from the position for supply of the to-be-treated gas. Water vapor is supplied to the first supply member 13 through a flow control valve 14 and a heating unit 15.

On the opposite side of the first supply member 13 in the axial direction of the honeycomb rotor 2 there is provided a first collecting member 16 for collecting water vapor that has been used in desorbing the solvent adsorbed on the activated carbon in the honeycomb rotor 2, which water vapor is now laden with solvent, without leaking. The solvent laden water vapor (hereinafter referred to as mixed water vapor) collected by the first collecting member 16 is conducted to condensers 17, 18, to which cool water is supplied, is condensed therein, and is then conducted to a separator unit 19. The separator unit 19 is equipped with an overflow weir 20 so that organic solvents, such as thinners, lower in specific gravity than water can be separated and recovered.

In the vicinity of the first supply member 13 there are provided a second supply member 21 and a third supply member 22 for supply of hot air and cool air, as will be explained hereinafter. Hot air is supplied to the second supply member 21 through a flow control valve 24 of a blower 23 and a heating unit 25. Air transported from the blower 23 under pressure is supplied to the third supply member 22 as cool air through a flow control valve 26.

On the opposite side of the supply members 21, 22 in the axial direction of the honeycomb rotor 2 there are provided a second collecting member 27 and a third collecting member 28. Hot air and cool air from these collecting members 27, 28 respectively are induced into the blower 9 through dampers 29, 30. Residual air discharged from the condensers 17 and 18 after water vapor is condensed therein is also induced into the blower 9 through a pipe line 68 and a damper 31.

Referring again to FIGS. 2 to 4, the recovery apparatus 4 will be explained. The honeycomb rotor 2 with its axis 3 extending generally along a vertical plane is disposed in the housing 32 of the recovery apparatus 4. A rotary shaft 33 is fixed to the honeycomb rotor 2 coaxially therewith and is rotatably supported in a bearing 34.

On one side portion of the honeycomb rotor 2 in the axial direction thereof (upper side in FIG. 2) there is provided a bottomless box shaped cover member 35 having a sector configuration in plan view as best shown in FIG. 3. The cover member 35 has radially extending partition plates 36, 37 whereby its interior is divided into three compartments which constitue first supply member 13, second supply member 21, and third supply member 22. A rubber seal 38 is provided between this cover member 35 and the honeycomb rotor 2.

The supply members 13, 21, 22 are respectively equipped with supply pipe lines 39, 40, 41 for supplying water vapor, hot air, and cool air respectively.

On the axially extending other half of the honeycomb rotor 2 (lower side in FIG. 2) there is provided a cover member 43 with a rubber seal 42 abutting against the honeycomb rotor 2 and configured generally symmetrically with the cover member 35. This cover member 43 has three compartments defined therein for desorbing the solvent adsorbed on activated carbon grains in the honeycomb rotor 2 and individually collecting solvent-laden mixture vapor, drying hot air, and drying cool air, which compartments constitute the first collecting member 16, the second collecting member 27, and the third collecting member 28, respectively.

These collecting members 16, 27, 28 are respectively equipped with discharge pipe lines 44, 45, 46 for discharging the water vapor, hot air, and cool air, respectively, outwardly of the recovery apparatus 4.

At an uppermost location in the interior of the housing 32 of the recovery apparatus 4 there is disposed a geared motor 6 for rotating the honeycomb rotor 2 on the axis thereof. A sprocket wheel 47 is mounted on the rotary shaft of the geared motor 6. Over the side periphery of the honeycomb rotor 2 there is trained a belt 49 formed with splines, which are in mesh engagement with a drive wheel 50 mounted on a rotary shaft 51, which is coaxial to rotor 2 and spaced to one side. On the other edge of the rotary shaft 51 there is mounted a sprocket wheel 52. A chain 48 is trained between the sprockets 47 and 52 so that the drive force of the geared motor 6 is transmitted to rotate the honeycomb rotor 2 in the direction of, for example, arrow A1 in FIG. 3.

In a lower portion of the housing 32 of the recovery apparatus 4 there is provided the supply port 53 through which gas to be treated is supplied, while in an upper portion of the housing 32 there is provided the discharge port 54 for discharge of cleaned air obtained through the treatment of the gas. A filter 55 is provided between the supply port 53 and the honeycomb rotor 2. The filter 55 is formed of a porous material containing activated carbon and functions to initially remove components which are likely to deteriorate the solvent adsorptive quality of the activated carbon grains in the honeycomb rotor 2.

The seal structure 5 is provided between the housing 32 and the honeycomb rotor 2. This seal structure 5 is a so-called water seal, which comprises a torus configured annular bath 56 and a similarly torus configured annular partition plate 57.

Figure 6:
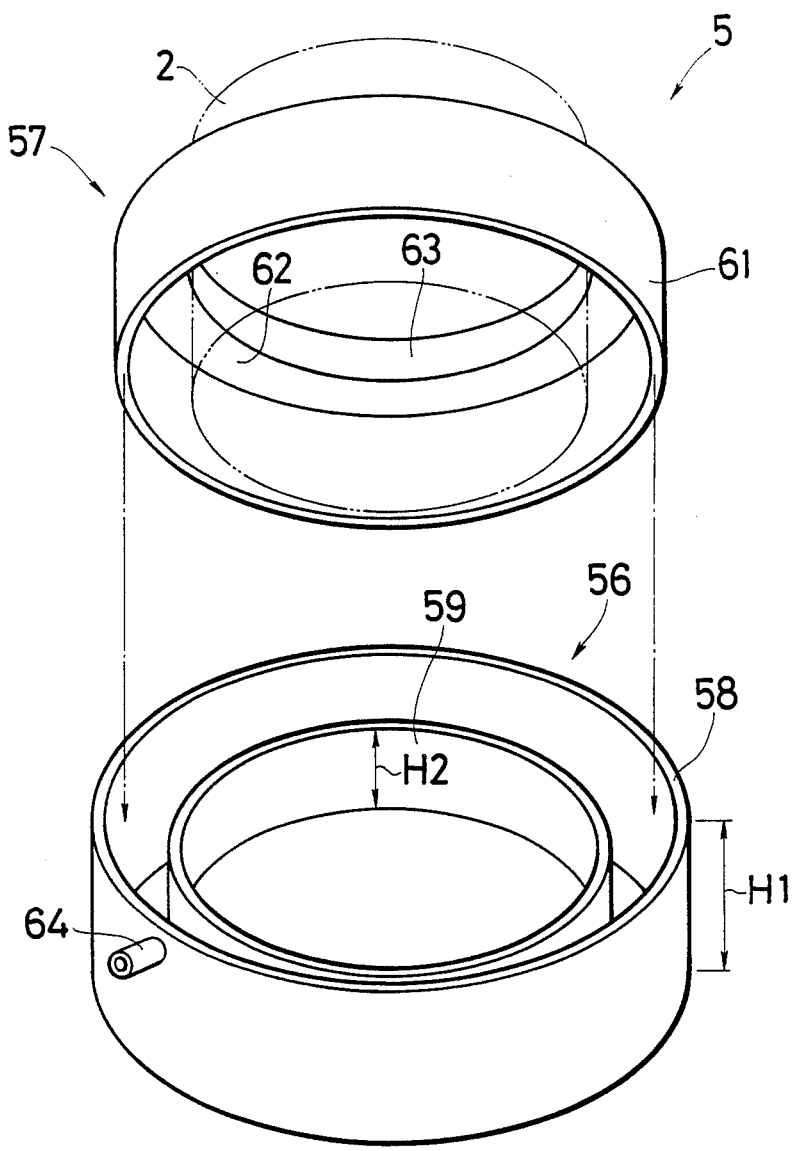
FIG. 6 is an exploded perspective view of a seal structure of the invention.

FIG. 6 is an exploded perspective view relating to the seal structure 5. Referring to FIG. 6 in particular, the annular bath 56 includes an outer tube 58 having an axial length H1 and an inner tube 59 having a radial length H2. The outer tube 58 and inner tube 59 are interconnected by a bottom plate 60, all three being thus integrally connected. It is noted that the length H1 and is greater than the length H2.

The annular partition plate 57 comprises a partition tube 61 having such an inner diameter as will permit the partition 61 to be interposed between the outer tube 58 and the inner tube 59, a connecting member 62 formed integrally with the upper end of the partition tube 61 and extending radially inwardly, and a tube shaped mounting member 63 axially extending from the radially inner end of the connecting member 62. The mounting member 63 is fixed to the side periphery of the honeycomb rotor 2. The outer tube 59 is provided with a water discharge port 64.

When water is poured into the annular bath 56 and the annular partition plate 57 is inserted therein, the interior of the housing 32 is partitioned in an airtight manner by the honeycomb rotor 2 and the seal structure 5 into the upper portion and lower portion. As already mentioned, gas to be treated is supplied through the supply port 53 and cleaned air is discharged from the air discharge port 54. Therefore, in the housing the lower portion is of higher pressure than the upper portion. In this case, as FIG. 4 shows, the following water level difference $\Delta H$ holds between the water level H3 of a portion between the inner tube 59 and the partition tube 61 on one hand and the water level H4 of a portion between the outer tube 58 and the partition wall 61 in the other hand.

This water level difference $\Delta H$, where $\Delta H = H4 - H3$, corresponds to the earlier mentioned atmospheric pressure difference.

The axial length H1 of the outer tube 58 is determined by an anticipated maximum atmospheric pressure difference during operation of the recovery apparatus 4, but it is to be noted that it is formed with such length as will not cause water leak that is detrimental to water seal.

Figure 7:
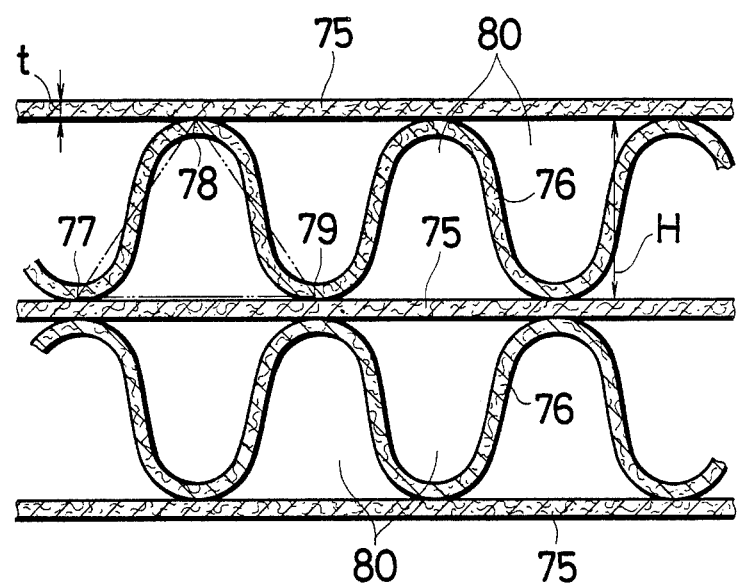
FIG. 7 is an axial orthogonal sectional view of a part of an adsorption body.

FIG. 7 is a sectional view in axial orthogonal section showing a part of an adsorption body 66. In the present embodiment, the adsorption body 66 is formed of material with a plurality of layers which are shaped with a plane sheet 75 and a corrugated sheet 76 which are anchored to each other. Each sheet 75, 76 is formed by baking a special sheet impregnated with water glass. The sheet is formed by a paper making process using a mixture of inorganic fiber, for example, ceramic fiber or glass fiber, which has excellent durability and burning resistance, and activated carbon which is fibroid or powdery.

The thickness of sheets 75, 76, is typically within 0.05–0.04 mm, and is preferably within 0.1–0.3 mm, and is yet more preferably within 0.1–0.2 mm. The distance H between each plane sheet 75 and is selected within 1–3 mm, and is preferably 1.8 mm for example. An imaginary triangle (shown by two-dot chain lines in FIG. 7) preferably forms an equilateral triangel, which is defined by three neighboring contact points 77, 78, and 79 between plain sheets 75 and corrugated sheets 76.

In the mixing ratio of inorganic fiber and activated-carbon forming the sheets 75, 76, activated-carbon is within 20–80 W %, preferably 30–70 W %, and yet more preferably 50 W %. If the flow ratio increases, intensity of sheet 75, 76 is improved.

Each of the sheets 75, 76 forms a number of a gas passages 80, and therefore the flow rate is increased. In this embodiment, the shape of the imaginary triangle is not restricted to an equilateral triangle.

Operation of the recovery system 1 of the present embodiment will now be described with reference to the drawings. A to-be-treated gas containing, for example, thinner is taken in through the damper 8 and then supplied in the housing 32 of the recovery apparatus 4 through the supply port 53 via the blower 9 and the damper 10. As the geared motor 6 of the recovery apparatus 4 is driven, the honeycomb 2 is rotated in the direction of arrow A1 in FIG. 3.

The to-be-treated gas supplied from the supply port 53, after dust and components which are liable to deteriorate the solvent adsorptive characteristic of the honeycomb rotor 2 are removed by the filter 55, is fed into the honeycomb rotor 2 through a portion thereof other than the portion covered with the cover member 43. In the interior of the honeycomb rotor 2, solvent components are adsorbed on activated carbon grains, and cleaned air is discharged from the rotor and through the discharge port. The cleaned air is then released into the atmosphere through the blower 11 and the damper 12.

An arcuate section of the honeycomb rotor 2 with solvent adsorbed thereon constantly enters the region covered by the cover members 35, 43 as the rotor 2 rotates in the direction of arrow A1. In the interior of the cover members 35, 43, water vapor is supplied from the first supply member 13 and accordingly solvent is desorbed from the activated carbon grains in the honeycomb rotor 2. A water vapor mixture in which solvent is present is conducted through the discharge pipe line 44 to the condensers 17, 18, in which the mixture is condensed. The consensed liquid is separated into water and solvent in the separating unit 19..

As already mentioned, desorption of solvent from the honeycomb rotor 2 is carried out by using water vapor, and accordingly the honeycomb rotor 2 gets wet. Now, as the honeycomb rotor 2 rotates in the direction of arrow A1, hot air is supplied to the portion of the honeycomb rotor 2 which has gotten wet in the course of solvent desorption, so that drying of the wet portion is effected. Hot air which has been used for this drying treatment is induced into the blower 9 through the damper 29, whereupon the gas to be treated is concentrated.

Cool air is supplied from the third supply member 22 to the hot-air dried portion of the honeycomb rotor 2, whereby that portion is sufficiently dried and cooled. Cool air which has been used for this treatment is induced into the blower 9 through the discharge pipe line 46 and the damper 30, whereby the gases to be treated is additionally concentrated.

By the to-be-treated gases being concentrated in this way before it is supplied to the recovery apparatus 4, improved solvent adsorption efficiency can be obtained.

In the recovery system of the present embodiment, as described above, the stages of solvent adsorption and solvent desorption can be carried out in parallel and continuously by using the honeycomb rotor 2. Thus, working efficiency can be remarkably improved in the solvent recovery operation. Furthermore, one single honeycomb rotor 2 is sufficient to perform such a recovery operation, which makes is possible to provide a recovery apparatus of much smaller size than the conventional fixed bed type or fluidized bed type recovery apparatus.

In experiments conducted by the present inventor, it has been confirmed that the range of air flow rates in the recovery apparatus of the recovery system can be increased to 1.5-2.0 m/sec or 2 to 10 times higher than usual with the prior art apparatuses.

In the recovery apparatus of the present embodiment, the axis 3 of the honeycomb rotor 2 extends along a generally vertical plane. That is, the honeycomb rotor 2 is of the so-called horizontal type. Therefore, the solvent adsorption/desorption operation can be conveniently performed by supplying water vapor to the honeycomb rotor 2 axially from above and thus there is no such possibility that water produced from the water vapor in the honeycomb rotor 2 collects in a lower portion of the rotor 2 as it would in the case where the rotor 2 is of the vertical type, with the result that the reactivating and drying operations of the vertical type honeycomb rotor 2 is hindered.

According to the experiments conducted by the present inventor, with the recovery apparatus 4 of the invention, the level of pressure loss is reuduced to approximately 30 mmAq or 1/5 to 1/17 of that usual with the prior art recovery apparatuses. Naturally, therefore, the blowers 9, 11, 23 employed in the present embodiment are of reduced size and capacity. This will lead to overall compact design and reduced operating cost.

With the prior art recovery apparatuses of both the fixed bed type and the fluidized bed type mentioned earlier, it is necessary to employ adsorption towers or desorption towers loaded with activated carbon, and furthermore, where water vapor is used for solvent desorption purposes, it is necessary that not only the activated carbon be desorbed, but also the vessels constituting the adsorption or desorption towers in which the activated carbon is housed should be heated up to prescribed temperatures. In contrast to this, the recovery system of the present embodiment is such that only the honeycomb rotor 2 must be subjected to the process of desorption by water vapor and heating for the purpose of desorbing the honeycomb rotor 2 by water vapor, and therefore the amount of water vapor necessary for the desorbing operation can be reduced to one half the level usual with the prior art, according to calculations made by the present inventor.

Where the solvent to be recovered is a halogen solvent, anti-corrosion measures are required. In the recovery system 1 of the present embodiment, however, it is only necessary that such measures be taken with components associated with the recovery apparatus 4. Thus, considerable reduction can be obtained in operating cost.

In the recovery system 1 of the present embodiment, as FIG. 5 shows, air containing water vapor discharged from the condenser 17 in which solvent laden water vapor is condensed and removed is recycled to the recovery apparatus 4 for treatment purposes. Thus, air discharged from the condenser 17 that will likely contain unrecovered solvent can be prevented from being released into the atmosphere, whereby remarkable improvement can be obtained in solvent recovery efficiency.

The seal structure 5 used in the recovery system 1 of the present embodiment can prevent leakage of the gas being treated that may be caused due to possible corrosion as anticipated with any commonly employed rubber seal, and/or increased friction resistance due to slide contact of the honeycomb rotor 2 and/or other components with the rubber seal, which means considerable improvement in service performance.

The seal arrangement of the invention is not only applicable to the solvent recover apparatus 4 and circulation type solvent recovery system 1 of the above described embodiment, but is it also applicable for use in other fields of operation.

In this embodiment, the adsorption body 66 is formed of inorganic fiber and activated carbon with the structure of a honeycomb. The flow rate is increased and pressure loss is decreased. Accordingly this embodiment leads to an overall compact design and reduced power requirements. The adsorption body is activated directly by water vapor, and accordingly either the cooling means 71 or the adsorption means 72 of the prior art device is not needed, which reduces the size of the apparatus.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A solvent recovery apparatus, comprising:

a housing, said housing having upper and lower chambers, a gas inlet communicating with said lower chamber and a gas outlet communicating with said upper chamber;

a rotor mounted within said housing for rotation about an axis;

means for rotating said rotor;

adsorbent means mounted within said rotor;

seal means disposed between the outer periphery of said rotor and said housing, said rotor and said seal means separating said upper and said lower chambers;

adsorbent recovery means including an airtight case covering an arcuate section of said rotor and having three airtight arcuate sections, means for introducing a first recovery gas into a first of said three sections, means for introducing a second recovery gas into a second of said three sections, and means for introducing a third recovery gas into a third of said three sections, said first, second and third sections being arranged sequentially in the direction of rotation of said rotor;

first, second and third means for receiving gaseous output from said first, second and third sections, respectively, said second and said third output receiving means each comprising conduit means in communication with said gas inlet of said housing, and said first output receiving means comprising condenser means and conduit means in gas communication with said condenser means and said gas inlet of said housing for feeding gaseous output from said condenser means to said gas inlet of said housing.

2. An apparatus as in claim 1, further comprising damper means within each of said conduit means.

3. An apparatus as in claim 1, further comprising a first blower in communication with said gas inlet for forcing gas to be treated into said lower chamber, a damper disposed between said first blower and said gas inlet, and a second blower in communication with said gas outlet for removing treated gas from said upper chamber by suction.

4. An apparatus as in claim 1, wherein said first output receiving means further comprises separator means for separating fluids condensed in said condenser means, said separator means being in fluid communication with said condenser means to thereby receive liquid output from said condenser means.

* * * * *